United States Patent [19]

Gordy et al.

[11] 4,149,121
[45] Apr. 10, 1979

[54] FOUR PHASE TO TWO PHASE CORRELATOR

[75] Inventors: Robert S. Gordy, Largo; David E. Sanders, St. Petersburg; Ramon P. Chambers, Clearwater, all of Fla.

[73] Assignee: NCR Corporation, Dayton, Ohio

[21] Appl. No.: 809,235

[22] Filed: Jun. 23, 1977

[51] Int. Cl.² .............................................. H04B 1/16
[52] U.S. Cl. .................................... 325/321; 325/323; 328/165
[58] Field of Search ................... 325/30, 38 R, 41, 42, 325/65, 321, 323, 324; 328/155, 162, 163; 332/9 R

[56] References Cited

U.S. PATENT DOCUMENTS

| 3,706,933 | 12/1972 | Bidell | 325/42 |
| 3,916,313 | 10/1975 | Lowry | 325/65 |
| 4,017,798 | 4/1977 | Gordy | 325/30 |
| 4,039,749 | 8/1977 | Gordy | 178/69.1 |

*Primary Examiner*—Robert L. Griffin
*Assistant Examiner*—Michael A. Masinick
*Attorney, Agent, or Firm*—J. T. Cavender; Edward Dugas

[57] ABSTRACT

A four phase to two phase correlator is incorporated within the demodulator section of a spread spectrum modem to process a received RF signal modulated by a transmitted PN code and a digital data signal. The correlator includes a first modulator for combining the channel 1 and channel 2 R code signals with the received RF input signal to generate a first channel 1 RF signal and a first channel 2 RF signal. The first channel 1 RF signal is modulated by the transmitted PN code signal, the channel 1 R code signal and the digital data signal. The first channel 2 RF signal is modulated by the transmitted PN code signal, the channel 2 R code signal and the digital data signal. A second modulator combines the channel 1 and channel 2 PN code signals and the channel 1 and channel 2 R code signals with a first unmodulated RF signal to generate a second channel 1 RF signal which is modulated by the channel 1 PN code signal and by the channel 1 R code signal, and a second channel 2 RF signal which is modulated by the channel 2 PN code signal by the channel 2 R code signal. A third modulator combines both channels of the first and second RF signals to generate a third RF signal which is modulated only by the digital data signal.

14 Claims, 5 Drawing Figures

FOUR PHASE TO TWO PHASE CORRELATOR

BACKGROUND OF THE INVENTION

This invention relates to demodulators, and more particularly, to a spread spectrum demodulator for demodulating a spread spectrum four phase PSK RF signal.

In digital data transmission systems it is frequently desirable to provide a system of modulation which will increase the immunity of the transmission system to intentional jamming and to provide a highly secure data encoding system which can only be demodulated by selected receiver systems. One method of accomplishing these two goals is to provide a digital communication system in which the bandwidth of the transmitter signal is spread over a substantially greater bandwidth than the bandwidth of the data signal. This is generally accomplished by mixing the digital data signal with a wide band pseudo-random sequence of pulses. The psuedo-random modulated data signal then phase modulates a reference carrier signal.

This modulation method generates a wide band RF signal which is commonly known as a spread spectrum signal. Spread spectrum signals are highly secure in that only receivers capable of generating a pseudo-random sequence of pulses identical to the transmitted sequence will be capable of demodulating the digital data signal.

Prior art spread spectrum demodulators have incorporated four phase to two phase correlator circuits which perform adequately but are structurally relatively simple. As a result of the structural simplicity of these prior art correlators, the maximum achievable processing gain of the correlator is limited. Utilization of a minimum number of mixers in prior art correlator circuits often results in a less than desirable degree of isolation between the input of the correlator and its output. An additional disadvantage of the relatively straightforward prior art correlator circuit designs is that they provide only a minimal resistance to jamming. In a hostile electromagnetic environment which includes active electronic countermeasures systems, extremely high resistance to jamming is an absolutely essential requirement for the successful operation of a communications system.

Apparatus related to the present invention and which are designed to demodulate a spread spectrum signal modulated by a pseudo-random code sequency have been described in two commonly assigned pending United States Patent Applications entitled, "Spread Spectrum Demodulator" (Ser. No. 611,366) and "Improved Spread Spectrum Demodulator" (Ser. No. 611,367) which were filed simultaneously on September 8, 1975. Each of these pending patent applications contains background and disclosure material which is relevant to the description of the present invention.

SUMMARY OF THE INVENTION

It is therefore a primary object of the present invention to provide a four phase to two phase correlator which provides a significantly increased resistance to CW jamming signals by correlating a wide bandwidth transmitted signal into a narrow bandwidth data output signal to substantially decrease the energy of the jamming signal contained in the data output signal.

Another object of the present invention is to provide a four phase to two phase correlator which provides increased isolation between its input and output stages.

Yet another object of the present invention is to provide a four phase to two phase correlator which provides increased signal processing gain.

Briefly stated and in accordance with one embodiment of the invention, a four phase to two phase correlator is incorporated within the demodulator section of a spread spectrum modem to process a received RF signal modulated by a transmitted PN code and a digital data signal. The correlator correlates a four phase PN (pseudo noise) code which is internally generated within the demodulator section of the modem with a received four phase PSK (phase shift keyed) modulated carrier signal to provide a two phase collapsed spectrum data output signal.

The demodulator section of the modem includes a circuit for generating a channel 1 PN code signal and a channel 1 R (phase shifted PN code) code signal and another circuit for generating a channel 2 PN code signal and a channel 2 R code signal.

The correlator itself includes first modulator means for combining the channel 1 and channel 2 R code signals with the received RF signal to generate a first channel 1 RF signal and a first channel 2 RF signal. The first channel 1 RF signal is modulated by the transmitted PN code signal, the channel 1 R code signal and the digital data signal. The first channel 2 RF signal is modulated by the transmitted PN code signal, the channel 2 R code signal and the digital data signal.

The correlator also includes second modulator means for combining the channel 1 and channel 2 PN code signals and the channel 1 and channel 2 R code signals with a first unmodulated RF signal to generate a second channel 1 RF signal which is modulated by the channel 1 PN code signal and by the channel 1 R code signal and a second channel 2 RF signal which is modulated by the channel 2 PN code signal and the channel 2 R code signal.

Third modulator means combines both channels of the first and second RF signals to generate a third RF signal which is modulated only by the digital data signal. Wideband noise and virtually all of any CW jamming signal will have been eliminated from the third RF signal. The digital data signal can readily be detected from the third RF signal and further processed.

DESCRIPTION OF THE DRAWINGS

The invention is pointed out with particularity in the appended claims. However, other objects and advantages, together with the operation of the invention, may be better understood by reference to the following detailed description taken in connection with the following illustrations wherein:

DESCRIPTION OF THE PREFERRED EMBODIMENT

Figure 1:
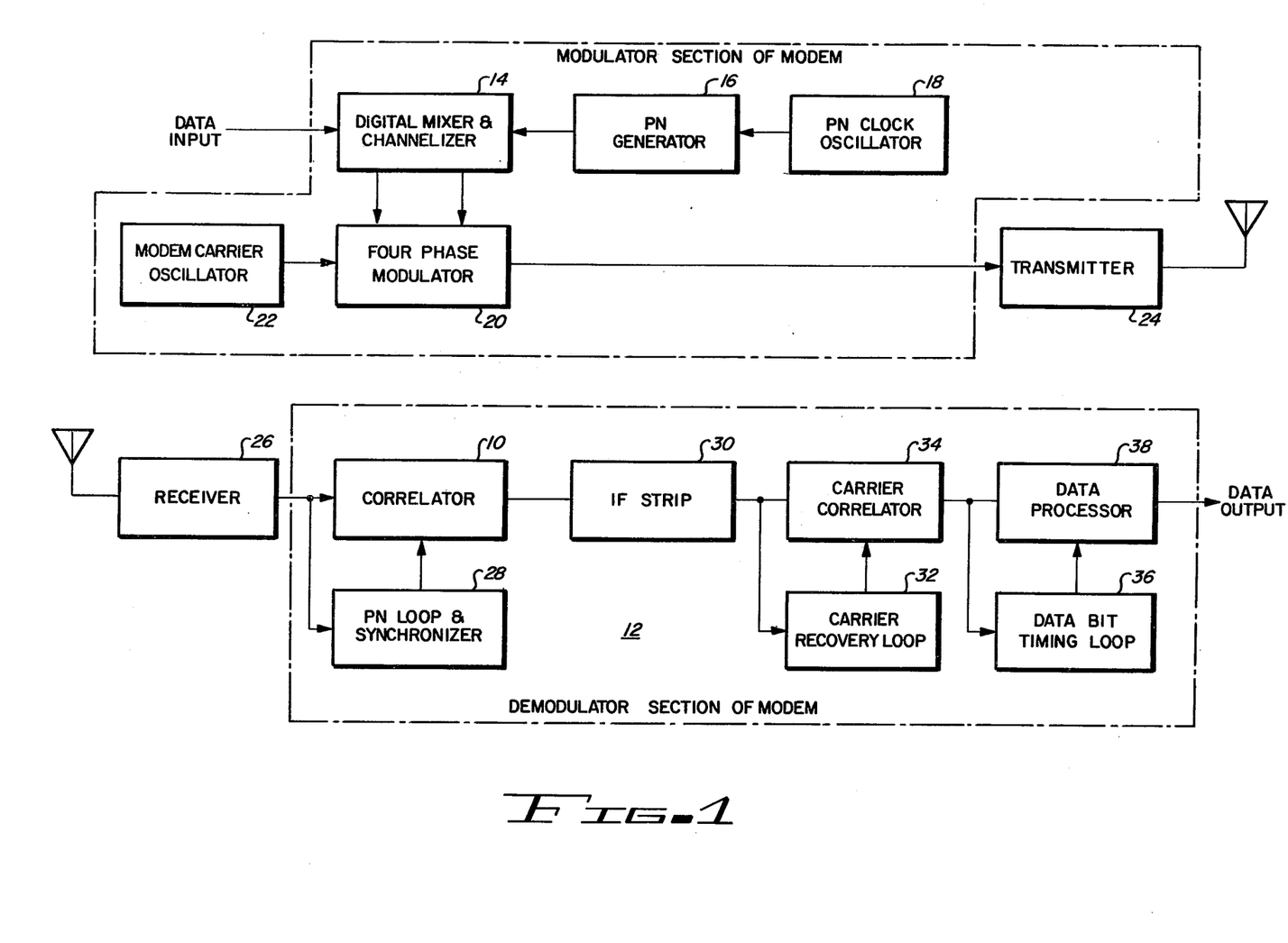
FIG. 1 is a generalized block diagram of a complete spread spectrum modem which includes a four phase to two phase correlator of the present invention.

Referring to FIG. 1, correlator 10 of the present invention is typically incorporated within a spread spectrum PSK modem similar to the one shown in FIG. 1. The digital data input signal is mixed in digital mixer and channelizer 14 with a pseudo-random (PN) sequence which is generated by a PN generator 16. The modulation of the digital data signal with the pseudo-random sequence spreads the digital data signal over the wide bandwidth of the PN sequence. A PN clock oscillator 18 sets the bit rate of PN generator 16 which will be high compared to the bit rate of the digital data signal. The digitally mixed wideband signal is channelized as required by digital mixer and channelizer 14. The model carrier oscillator 22 generates an output signal which is phase modulated by the wideband signal from digital mixer 14 in phase modulator 20. This modulation process produces a spread spectrum signal which is transmitted over a communications channel by a transmitter 24. Alternatively, the spread spectrum output signal may be achieved by first phase modulating the carrier signal with the digital data system and then combining that modulated signal with the PN sequence. In either case, the final bandwidth of the output signal is dictated by the PN sequence bandwidth and the type of modulation, such as biphase, four phase or staggered four phase modulation.

The transmitted signal is received and amplified in receiver 26, which band limits and converts to a higher frequency both the transmitted spread spectrum PSK signal and any jamming signals accepted by the receiver antenna. The output of receiver 27 is fed to both a PN timing loop and synchronizer 28 and to the correlator 10, which is the subject of the present disclosure.

PN timing loop and synchronizer 28 generates a local PN sequence identical to that generated by PN generator 16 in the modulator section of the modem. Upon receiving an input signal, PN timing loop and synchronizer 28 searches the received spread spectrum signal until the locally generated PN sequence has the same phase relationship as the PN modulation of the received spread spectrum signal. Synchronizer 28 then maintains the locally generated PN sequence phase locked to the received PN modulation.

The locally generated PN sequence produced by PN timing loop and synchronizer 28 under phase locked conditions is correlated by correlator 10 with the received spread spectrum signal. The output signal from correlator 10 is a narrow band carrier signal which is phase modulated by the digital data signal plus wideband noise and a spread CW jamming signal.

An IF strip 30 in the demodulator section 12 of the modem amplifies and filters the data output signal from correlator 10 removing most of the undesired energy contained in the wideband noise and spread CW jamming signal. The narrow band PSK output signal from IF strip 30 is coupled to a carrier recovery loop 32 which generates a clean carrier signal and locks it with one of the carrier phases of the signal from IF strip 30. The output signal from carrier recovery loop 32 is then correlated with the signal from IF strip 30 in a carrier correlator 34. The output of carrier correlator 34 is baseband data plus some undesired signal components caused by the jamming signal and noise.

The output signal from carrier correlator 34 is coupled to a bit timing loop 36 and to a data processor 38. Bit timing loop 36 generates a clean bit timing signal at the data clock rate and phase locks in with the proper phase relationship to the baseband data. Data processor 38 match filters the baseband data, samples every bit time at the correct bit phase, holds the sampled data between samples, and converts the sampled data into the appropriate data output levels.

Figure 2:
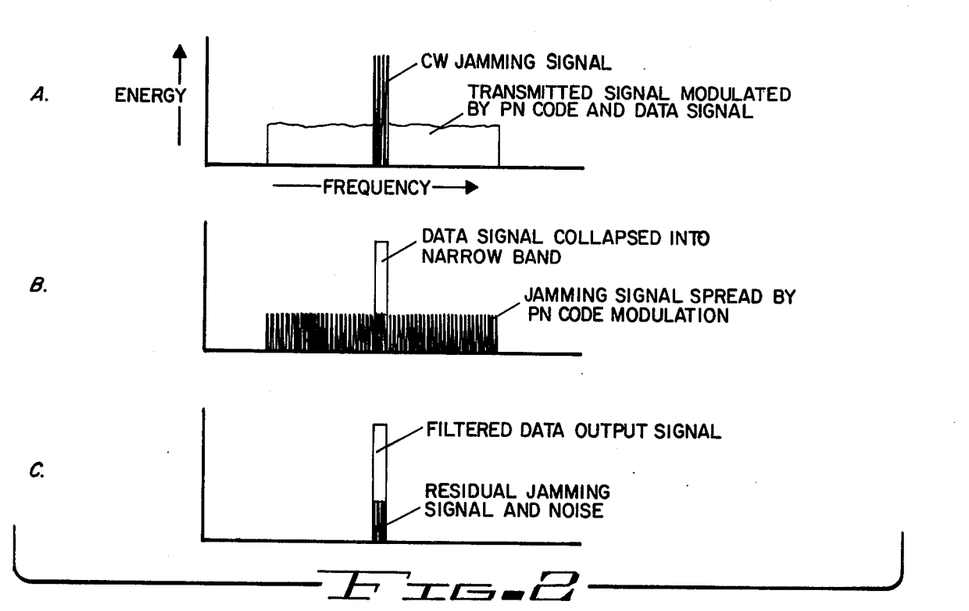
FIG. 2 is a series of three graphs which further explain the operation of the spread spectrum modem shown in FIG. 1.

As illustrated in FIG. 2, the increased resistance to jamming signals is obtained by spreading the transmitted signal over a wide bandwidth (FIG. 2A) and then correlating the received spread spectrum transmitted signal into a narrow bandwidth digital data signal (FIG. 2C) from which virtually all jamming signal strength has been removed. In the process of establishing this narrow bandwidth digital data signal, the correlator 10 which is situated within the demodulator section 12 of the modem spreads an incoming CW jamming signal over a wide bandwidth (FIG. 2B) thus decreasing the jamming energy contained within the narrow digital data bandwidth.

Channel 1 (0–180°) PN and R codes and channel 2 (90–270°) PN and R codes are locally generated in the demodulator section of the modem shown in FIG. 1 by PN timing loop and synchronizer 28 in a manner well known to those skilled in the art. The PN and R codes of each channel are identical digital signals which have been shifted in phase by a predetermined number of bits with respect to each other by PN timing loop and synchronizer 28.

Figure 3:
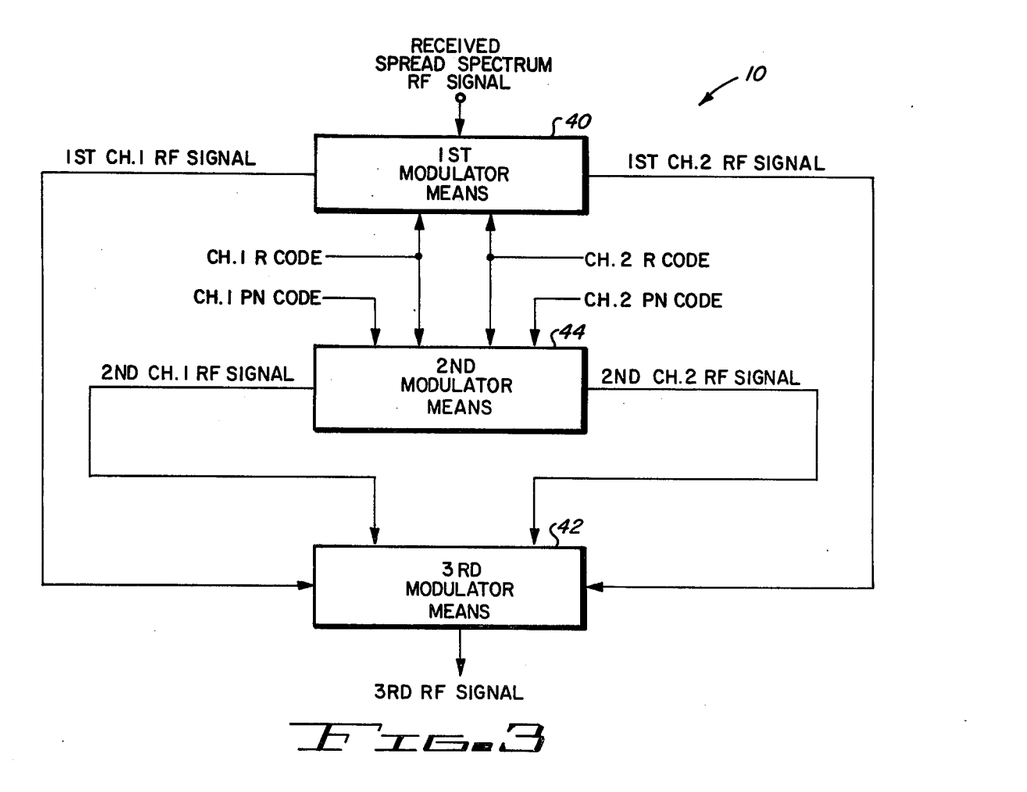
FIG. 3 is a highly generalized block diagram of the four phase to two phase correlator of the present invention.

Referring now to FIG. 3, a highly generalized block diagram of correlator 10 of FIG. 1 will be discussed. The received spread spectrum RF input signal to correlator 10 has a carrier frequency $F_1$ modulated by the transmitted PN code and the digital data signal. This received spread spectrum RF signal is coupled to the input of first modulator means 40 which combines it with the channel 1 and channel 2 R code signals (locally generated in the modem) to generate a first channel 1 RF signal and a first channel 2 RF signal. The first channel 1 RF signal is modulated by the transmitted PN code signal, the channel 1 R code signal and the digital data signal. The first channel 2 RF signal is modulated by the transmitted PN code signal, the channel 2 R code signal and the digital data signal. The channel 1 and channel 2 output signals from first modulator means 40 are coupled to third modulator means 42.

Second modulator means 44 combines the channel 1 and channel 2 PN code signals (locally generated in the modem) and the channel 1 and channel 2 R code signals with a first unmodulated RF signal having a frequency $F_2$ to generate a second channel 1 RF signal. The first unmodulated RF signal of frequency $F_2$ is generated in the modem and is applied to the correlator of the present invention. The second channel 1 RF signal is modulated by the channel 1 PN code signal and by the channel 1 R code signal. Second modulator means 44 also generates a second channel 2 RF signal which is modulated by the channel 2 PN code signal and by the channel 2 R code signal. The channel 1 and channel 2 output signals from second modulator means 44 are also coupled to inputs of third modulator means 42.

Third modulator means 42 combines both channels of the first and second RF signals generated by first modulator means 40 and second modulator means 44 to generate a third RF signal which is modulated only by the digital data signal.

Figure 4:
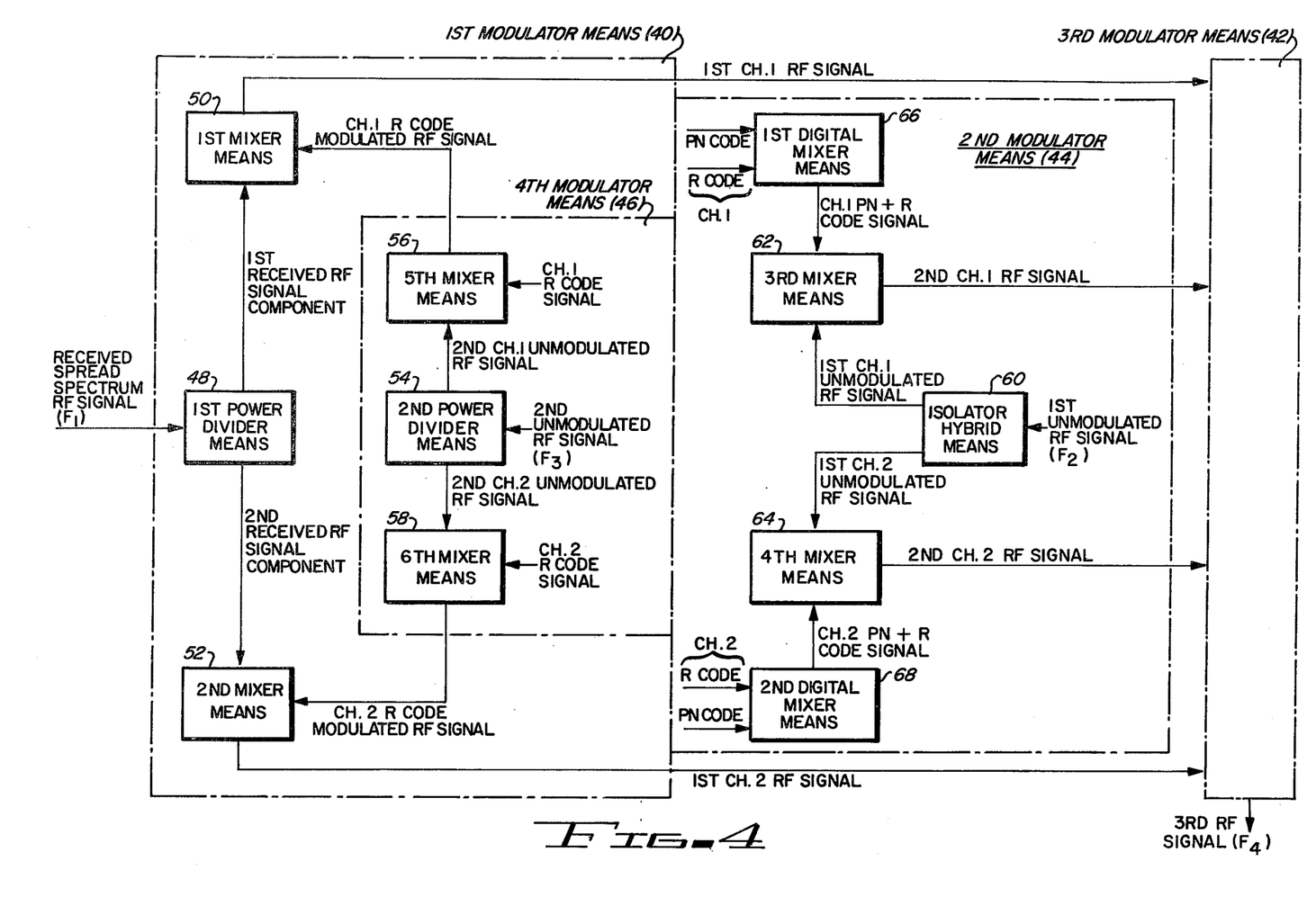
FIG. 4 is an intermediate level block diagram of the four phase to two phase correlator of the present invention.

Referring now to FIG. 4, the elements of correlator 10 and the signal flow path thereof will be discussed in greater detail.

First modulator means 40 also includes fourth modulator means 46. Fourth modulator means 46 includes second power divider means 54, fifth mixer means 56 and sixth mixer means 58. Second power divider means 54 equally divides the second unmodulated RF signal having a frequency $F_3$ into a second channel 1 unmodulated RF signal and a second channel 2 unmodulated RF signal. The second unmodulated RF signal, of frequency $F_3$, is generated in the modem; the relationship of the frequencies $F_2$, $F_3$ and the received signal center frequency $F_1$ will be described hereinafter. Fifth mixer means 56 combines the channel 1 R code signal with the second channel 1 unmodulated RF signal to generate the channel 1 R code modulated RF signal. Sixth mixer means 58 combines the channel 2 R code signal with the second channel 2 unmodulated RF signal to generate the channel 2 R code modulated RF signal.

First modulator means 40 includes first power divider means 48 which equally divides the received RF signal into first and second received RF signal components. The first received RF signal component is coupled to first mixer means 50 which mixes that signal with the channel 1 R code modulated RF signal to generate the first channel 1 RF signal. Second mixer means 52 combines the second received RF signal component with the channel 2 R code modulated RF signal to generate the first channel 2 RF signal.

Second modulator means 44 includes a quadrature hybrid or isolator hybrid means 60, third mixer means 62, fourth mixer means 64, first digital mixer means 66 and second digital mixer means 68.

First digital mixer means 66 combines the channel 1 PN code signal with the channel 1 R code signal to generate a channel 1 PN plus R code signals. Second digital mixer means 68 combines the channel 2 R code signal with the channel 2 PN code signal to generate a channel 2 PN plus R code signal.

Isolator hybrid means 60 equally divides a first unmodulated RF signal having a frequency $F_2$ into a first channel 1 unmodulated RF signal and a first channel 2 unmodulated RF signal. Isolator hybrid means 60 is a 90° hybrid which alters the phase angle between the first channel 1 unmodulated RF signal and the first channel 2 unmodulated RF signal so that they are phase shifted 90° with respect to one another.

Third mixer means 62 combines the channel 1 PN plus R code signal with the first channel 1 unmodulated RF signal to generate the second channel 1 RF signal. Fourth mixer means 64 combines the channel 2 PN plus R code signal with the first channel 2 unmodulated RF signal to generate the second channel 2 RF signal.

Third modulator means 42 receives the first channel 1 RF signal and the first channel 2 RF signal from first modulator means 40 and the second channel 1 RF signal and the second channel 2 RF signal from second modulator means 44. Third modulator means 42 processes these four separate input signals in a manner to be described to generate the third RF signal which is modulated solely by the digital data signal plus very low amplitude noise and jamming signals.

Figure 5:
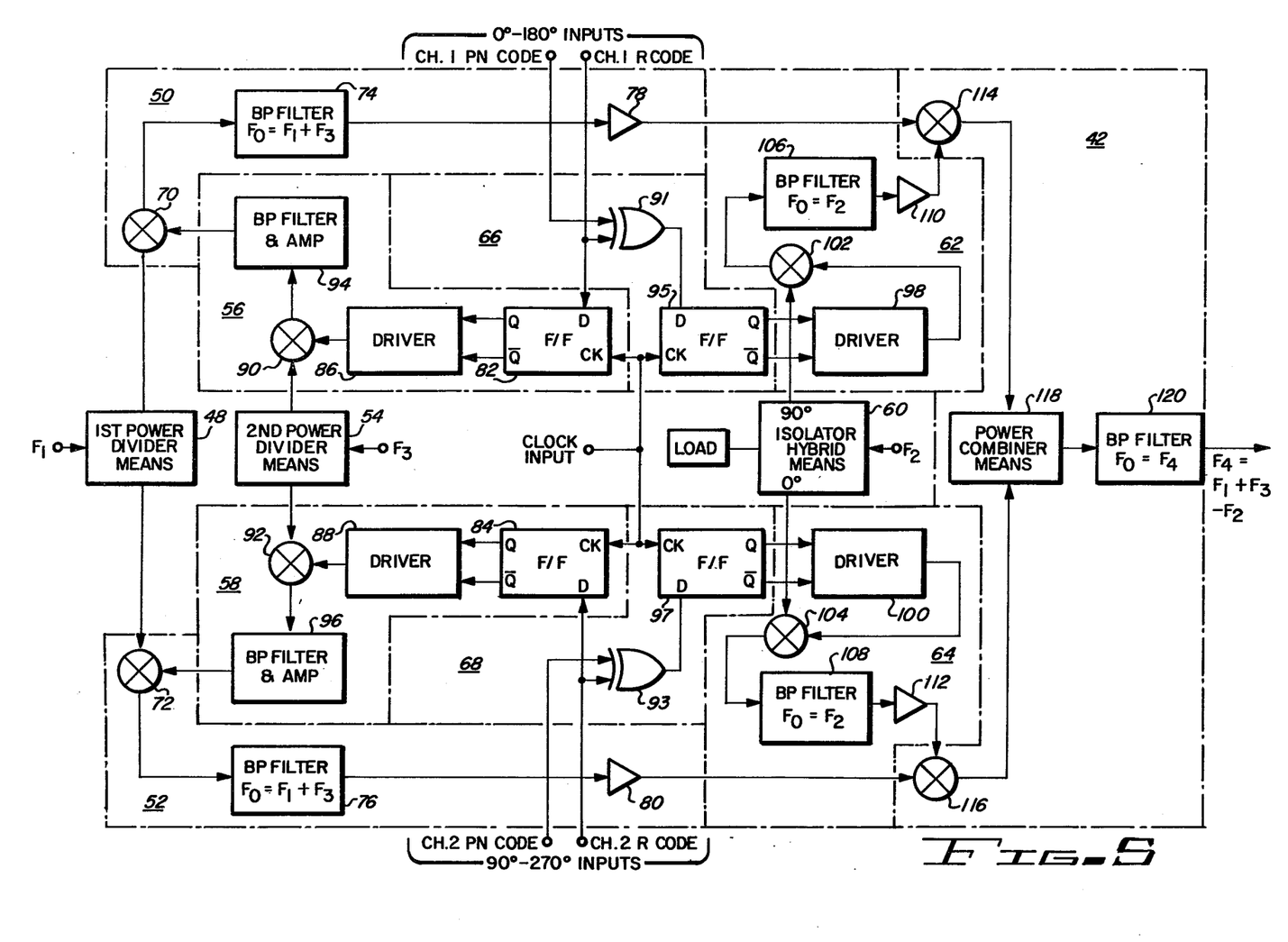
FIG. 5 is a schematic representation of the four phase to two phase correlator of the present invention.

Referring now to FIG. 5, a detailed schematic representation of the four phase to two phase correlator 10 of the present invention will now be described. The channel 1 and 2 PN code signals and channel 1 and 2 R code signals are provided by the demodulator section of the modem. These signals are synchronized and locked to the incoming RF signal by the PN loop and synchronizer of the demodulator. The received spread spectrum and jamming signals having a frequency centered about $F_1$ are equally split in phase by first power divider means 48 to form an input signal for each of the two identical signal processing channels of correlator 10. Although the two processing channels are identical in implementation, the code inputs and phase of the RF inputs to first mixer means 50 and second mixer means 52 are different.

Mixer means 50 and 52 include mixers 70 and 72, band pass filters 74 and 76, and amplifiers 78 and 80, respectively. Mixer means 56 and 58 include flip flops 82 and 84, drivers 86 and 88, balanced mixers 90 and 92, and band pass filters 94 and 96, respectively. Flip flops 82 and 84 serve merely to reclock the channel 1 and channel 2 R code signals to ensure time synchronization between these R code signals and the other digital signals in correlator 10. Drivers 86 and 88 increase the output amplitude of the digital signals from flip flops 82 and 84 to a level sufficient to drive balanced mixers 90 and 92. Power divider 54 operates as previously discussed to equally divide its input signal into a pair of signals to drive the second inputs of balanced mixers 90 and 92. The output signals from mixers 90 and 92 are R code modulated signals having a frequency centered about $F_3$. These two output signals have been referred to above as the channel 1 and channel 2 R code modulated RF signals. Band pass filter and amplifiers 94 and 96 decrease the switching signal amplitude from drivers 86 and 88 within the pass band of filters 74 and 76. The isolation provided by mixers 70 and 72 reduces the filter requirements for filters 94 and 96. Filters 94 and 96 isolate the switching signals from drivers 86 and 88 from the data signal path through first and second mixer means 50 and 52.

Band pass filters 74 and 76 are designed to select the sum output frequency from mixers 70 and 72 to provide an upward frequency translation. Without this upward frequency translation at mixers 70 and 72, only the isolation provided by mixers 70 and 72 would control the switching signal level within the pass band of filters 74 and 76. Although band pass filters 74 and 76 do provide increased protection against pulsed or swept jamming signals, their primary function is to attenuate the undesired mixer products generated by mixers 70 and 72. Amplifiers 78 and 80 are required to reduce the input noise figure of correlator 10 and to compensate for the signal losses induced by first power divider 48, mixers 70 and 72, and filters 74 and 76.

In second modulator means 44 first and second digital mixer means 66 and 68 include exclusive or gates or digital mixers 91 and 93 and flip flops 95 and 97, respectively. Third and fourth mixer means 62 and 64 include drivers 98 and 100, mixers 102 and 104, band pass filters 106 and 108, and amplifiers 110 and 112, respectively.

Digital mixers 91 and 93 mix the channel 1 PN code with the channel 1 R code and the channel 2 PN code with the channel 2 R code. Flip flops 95 and 97 serve strictly to reclock the output signals from mixers 91 and 93 to ensure proper time synchronization with the other digital signals of correlator 10. Drivers 98 and 100 increase the output amplitude of the digital signals from flip flops 95 and 97 to provide a sufficient drive level to balanced mixers 102 and 104.

The RF local oscillator signal $F_2$ is split by isolator hybrid means 60 (a quadrature hybrid) into two equal but 90° out-of-phase signals. Each of these output signals from isolator hybrid means 60 is then phase modulated in mixers 102 and 104 by the respective digitally mixed PN plus R code signals. The 90° hybrid is provided to convert the 0–180° phase shift of mixer 102 to a phase shift of 90–270°. A similar phase shifting or phase map rotation could be accomplished by interchanging isolator hybrid means 60 with power divider means 54 without changing the bandwidth requirements of the 90° hybrid.

The outputs of mixers 102 and 104 are bandwidth limited by filters 106 and 108, respectively, to attenuate both the switching and modulation frequencies which would otherwise lie within the desired data bandwidth centered at $F_4$. Without the attenuation of these two filters, undesired signal components would be amplified by amplifiers 110 and 112 to a level such that the isolation of mixers 114 and 116 in third modulator means 42 would be insufficient to prevent severe limiting of the input sensitivity of correlator 10. Mixers 70 and 72 are bandwidth limited by filters 74 and 76 for similar reasons. Amplifiers 110 and 112 are required to obtain sufficient drive power for mixers 114 and 116 to minimize conversion loss and intermodulation products. In a similar manner amplifier sections are required in band pass filters 94 and 96 to provide the appropriate drive levels to mixers 70 and 72.

The first channel 1 RF signal and the first channel 2 RF signal are mixed with the second channel 1 and channel 2 RF signals by mixers 114 and 116 and the resulting mixer output signals are added vectorially by a power combiner 118. This vector addition results in a 3dB signal loss. Provided that $F_4 \neq F_1$, $F_1 + F_3 \neq F_4$, and $F_2 - F_1 \neq F_4$, the frequency translations accomplished by mixers 70, 72, 114, and 16 will prevent the isolation of these mixers from limiting the maximum achievable processing gain or resistance to a CW jamming signal. The specific frequencies used are usually dictated by considerations outside the present correlator; for example, transmission characteristics, circuit capabilities and the like, will affect the choice of frequencies. However, it is important to select frequencies that are sufficiently and properly spaced relative to each other to minimize intermodulation.

Frequency translations at mixer pairs 70–72 and 114–116 are required to prevent switching signals from limiting the input sensitivity of correlator 10. The R code effectively increases the maximum achievable processing gain with respect to a synchronous CW jamming signal from that of the isolation of a single mixer, to that of two mixers in series. That is, the isolation of a single mixer such as 102 or 104 is effectively increased to that of two mixers in series such as mixer 90 in series with mixer 102, or mixer 92 in series with mixer 104.

Band pass filter 120 receives the output of power combiner means 118 and removes most of the undesired energy contained in the wideband noise and spread CW jamming signals. The filter bandwidth required depends on whether the following IF strip 30 (FIG. 1) includes a smaller bandwidth filter with the maximum bandwidth being set by the data bandwidth.

Four possible phase map rotation combinations exist which will result in a data biphase modulated output signal from correlator 10. The output of the 90° hybrid 60 can be inverted to couple its 90° port to mixer 104 and the 0° port to mixer 102. Also, the 90–270° channel PN code input to correlator 10 from the PN loop and synchronizer 28, can be inverted or the code channel signal between mixer 92 and mixer 104 can be inverted to generate an appropriate data output from correlator 10. With the isolator hybrid means coupled as shown in FIG. 5, inverting both the 0–180° and the 90–270° code inputs provides the correct data output. With isolator hybrid means 60 inverted, only the 0–180° channel PN code input need be inverted. Map rotations of this nature are well known to those skilled in the art.

The quadrature hybrid or isolator hybrid means 60, as well as the mixers, power dividers and combiners, are circuits which are well known and are readily available to those skilled in the art; for example, catalogs such as the Mini-Circuits Laboratory Catalog, 1975, or the Anzac Catalog, 1975, provide those skilled in the art with a selection of circuits that may be used in the correlator of the present invention.

In operation, the received spread spectrum RF signal is equally divided by the power divider 48 to form two channels. Although the two channels are identical and incorporate identical elements, the code inputs and phases of the RF inputs of the respective channels are different. The two outputs from the power divider 48 are mixed in mixers 70 and 72 with their respective R code channel signals, the latter generated by the phase modulations of the internally generated unmodulated RF frequency $F_3$ in mixers 90 and 92 respectively. The resulting first channel 1 and first channel 2 RF signals are applied to mixers 114 and 116 to be combined with the second channel 1 and second channel 2 RF signals. Each code channel has its PN and R codes digitally mixed by digital mixers or exclusive OR circuits 91 and 93; the locally generated unmodulated RF signal $F_2$ is split by the hybrid means 60 into two equal but 90° out-of-phase signals to be modulated in mixers 102 and 104 by its respective digitally mixed channel codes derived from the mixers 91 and 93. The outputs of the mixers 102 and 104 are each bandwidth limited by band pass filters 106 and 108 to derive the second channel 1 and second channel 2 RF signals. The outputs of the mixers 114 and 116 are added vectorially by the power combiner 118 and applied to band pass filter 120 to remove the undesired energy contained in the wide band noise and spread CW jamming signals existing outside of the band pass of the filter 120. The center frequency $F_4$ of band pass filter 120 is related to the RF input carrier frequency and the locally generated unmodulated frequencies $F_2$ and $F_3$ in the manner shown in FIG. 5. It may be noted, however, that while the relationship of the frequencies ($F_4 = F_1 + F_3 - F_2$) is inherent in the correlator of the present invention, the selection of the locally generated frequencies $F_2$ and $F_3$ is limited only by the frequency capabilities of the circuits used and the need to eliminate intermodulation among the signals. The output signal from the band pass filter 120 is thus a two-phase nonspread PSK output signal which is available for further processing in the modem demodulator.

What is claimed is:

1. A four phase to two phase correlator for processing a received RF signal modulated by a transmitted PN code and a digital data signal, said correlator being adaptable for use within a modem having means for generating a channel 1 PN code signal, a channel 1 R code signal, a channel 2 PN code signal, and a channel 2 R code signal, said modem also including means for generating first and second unmodulated RF signals, said correlator comprising in combination:

(a) first modulator means connected to receive said RF signal, and to receive said channel 1 and channel 2 R code signals, for modulating said received RF signal with said channel 1 R code signal and with said channel 2 R code signal to generate a first channel 1 RF signal and a first channel 2 RF signal respectively, the first channel 1 RF signal being modulated by the transmitted PN code signal, the channel 1 R code signal and the digital data signal, and the first channel 2 RF signal being modulated by the transmitted PN code signal, the channel 2 R code signal and the digital data signal;

(b) second modulator means connected to receive said channel 1 and channel 2 R code signals, said first unmodulated RF signal, and to receive said channel 1 and channel 2 PN code signals, said second modulator means modulating said first unmodulated RF signal to generate a second channel 1 RF signal modulated by the channel 1 PN code signal and by the channel 1 R code signal and a second channel 2 RF signal modulated by the channel 2 PN code signal and by the channel 2 R code signal; and (c) third modulator means connected to said first and second modulator means to receive said first and second channel 1 RF signals and said first and second channel 2 RF signals for combining said signals to generate a third RF signal modulated only by the digital data signal.

2. The correlator set forth in claim 1 wherein said third modulator includes:

(a) a first mixer connected to receive and combine said first channel 2 RF signal and said second channel 2 RF signal to produce a first mixer output signal;

(b) a second mixer connected to receive and combine said second channel 1 RF signal and said first channel 1 RF signal to produce a second mixer output signal; and (c) a power combiner connected to said first and second mixers for receiving and combining said first and second mixer output signals.

3. The correlator set forth in claim 2 including a band pass filter connected to said power combiner and having a predetermined pass band of frequencies excluding the frequency of the RF signal received by said correlator.

4. The correlator set forth in claim 1 wherein said first modulator means includes a fourth modulator means connected to receive said channel 1 and channel 2 R code signals and said second unmodulated RF signal from said modem for producing channel 1 and channel 2 R code modulated RF signals for use by said first modulator means to generate said first channel 1 RF signal and said first means to generate said first channel 1 RF signal and said first channel 2 RF signal.

5. The correlator according to claim 4 wherein said first modulator means includes:

(a) first power divider means for equally dividing the received RF signal into first and second received RF signal components;

(b) first mixer means for mixing the first received RF signal component with the channel 1 R code modulated RF signal to generate the first channel 1 RF signal; and (c) second mixer means for combining the second received RF signal component with the channel 2 R code modulated RF signal to generate the first channel 2 RF signal.

6. The correlator according to claim 5 wherein said second modulator means includes:

(a) first digital mixer means for combining the channel 1 PN code signal with the channel 1 R code signal to generate a channel 1 PN plus R code signal; and (b) second digital mixer means for combining the channel 2 R code signal with the channel 2 PN code signal to generate a channel 2 PN plus R code signal, said channel 1 PN plus R code signal and channel 2 PN plus R code signal modulating said first unmodulated RF signal to produce said second channel 1 RF signal and said second channel 2 RF signal respectively.

7. The correlator according to claim 6 wherein said second modulator means further includes isolator hybrid means for equally dividing the first unmodulated RF signal into a first channel 1 unmodulated RF signal and a first channel 2 unmodulated RF signal, the first channel 1 unmodulated RF signal and the first channel 2 unmodulated RF signal being shifted in phase 90° with respect to one another.

8. The correlator according to claim 7 wherein said second modulator means further includes:

(a) third mixer means connected to receive said channel 1 PN plus R code signal and said first channel 1 unmodulated RF signal to produce said second channel 1 RF signal; and (b) fourth mixer means connected to receive said channel 2 PN plus R code signal and said first channel 2 unmodulated RF signal to produce said second channel 2 RF signal.

9. The correlator according to claim 8 wherein said fourth modulator means includes second power divider means connected to receive and equally divide the second unmodulated RF signal into a second channel 1 unmodulated RF signal and a second channel 2 unmodulated RF signal.

10. The correlator according to claim 9 wherein said fourth modulator means further includes:

(a) fifth mixer means connected to receive the channel 1 R code signal and the second channel 1 unmodulated RF signal to modulate said second channel 1 unmodulated RF signal with said channel 1 R code signal to generate the channel 1 R code modulated RF signal; and (b) sixth mixer means connected to receive the channel 2 R code signal and the second channel 2 unmodulated RF signal to modulate said second channel 2 unmodulated RF signal with said channel 2 R code signal to generate the channel 2 R code modulated RF signal.

11. The correlator set forth in claim 10 wherein said third modulator includes:

(a) a first mixer connected to receive and combine said first channel 2 RF signal and said second channel 2 RF signal to produce a first mixer output signal;

(b) a second mixer connected to receive and combine said second channel 1 RF signal and said first channel 1 RF signal to produce a second mixer output signal; and (c) a power combiner connected to said first and second mixers for receiving and combining said first and second mixer output signals.

12. The correlator set forth in claim 11 including a band pass filter connected to said power combiner and having a predetermined pass band of frequencies excluding the frequency of the RF signal received by said correlator.

13. A four phase to two phase correlator for use in the demodulator section of a modem for processing a received spread spectrum RF signal, said modem including means for generating channel 1 and channel 2 PN code signals, channel 1 and channel 2 R code signals, and first and second unmodulated RF signals, said correlator comprising:

(a) means for modulating said first unmodulated RF signal with said channel 1 R code signal to produce a channel 1 R code modulated RF signal;

(b) means for modulating said first unmodulated RF signal with said channel 2 R code signal to produce a channel 2 R code modulated RF signal;

(c) power divider means connected to receive said spread spectrum RF signal and to divide said signal into first and second component signals;

(d) means connected to receive said first component signal and to receive said channel 1 R code modulated RF signal to mix said signals and produce a first channel 1 RF signal;

(e) means connected to receive said second component signal and said channel 2 R code modulated RF signal to produce a first channel 2 RF signal;

(f) a first digital mixer means connected to receive said channel 1 PN and channel 1 R code signals to produce a channel 1 PN plus R code signal;

(g) a second digital mixer means connected to receive said channel 2 R code and channel 2 PN code signals to produce a channel 2 PN plus R code signal;

(h) means connected to receive said channel 1 PN plus R code signal and to receive said second unmodulated RF signal to produce a second channel 1 RF signal;

(i) means connected to receive said channel 2 PN plus R code signal and said second unmodulated RF signal to produce a second channel 2 RF signal;

(j) mixer means connected to receive said first channel 1 RF signal and said second channel 1 RF signal to produce a first mixer output signal;

(k) mixer means connected to receive said first channel 2 RF signal and said second channel 2 RF signal and produce a second mixer output signal;

(l) power combiner means connected to receive said first and second mixer output signals; and (m) band pass filter means connected to receive an output signal from said power combiner means, said filter having a center pass frequency different than the frequencies of said first and second unmodulated RF signals and different than the center frequency of said spread spectrum RF signal.

14. A four phase to two phase correlator for use in the demodulator section of a modem for processing a received spread spectrum RF signal, said modem including means for generating channel 1 and channel 2 PN signals, channel 1 and channel 2 R code signals, and first and second RF signals, said correlator comprising:

(a) means for dividing said spread spectrum RF signal into first and second channel signals;

(b) modulating means for modulating each said channel signals with a first RF signal modulated by a channel R code signal to thereby produce a channel RF signal for each of said channels;

(c) modulating means for modulating each of said channel RF signals with a signal generated by modulating said second RF signal with the digitally mixed PN and R codes for that channel to produce a second RF signal for each channel;

(d) modulating means for modulating each channel RF signal with the second RF signal for each respective channel to produce an RF output signal; and (e) power combiner means for combining said RF output signals and applying the combined output signal to a band pass filter.

* * * * *